US006952102B2

(12) United States Patent
Sakaki et al.

(10) Patent No.: US 6,952,102 B2
(45) Date of Patent: Oct. 4, 2005

(54) METHOD AND APPARATUS FOR MONITORING VACUUM DEGREE OF VACUUM IN VACUUM INTERRUPTER

(75) Inventors: Masayuki Sakaki, Shizuoka (JP); Hiroaki Sano, Shizuoka (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 10/332,388

(22) PCT Filed: Feb. 7, 2001

(86) PCT No.: PCT/JP01/00843

§ 371 (c)(1),
(2), (4) Date: Jan. 8, 2003

(87) PCT Pub. No.: WO02/49057

PCT Pub. Date: Jun. 20, 2002

(65) Prior Publication Data

US 2003/0173969 A1 Sep. 18, 2003

(30) Foreign Application Priority Data

Dec. 12, 2000 (JP) ....................................... 2000-376837

(51) Int. Cl.[7] ............................................... G01L 21/30
(52) U.S. Cl. ....................................................... 324/460
(58) Field of Search ................................. 324/463, 460, 324/133; 340/626

(56) References Cited

U.S. PATENT DOCUMENTS 4,547,769 A * 10/1985 Tanigaki et al. ............ 340/626

FOREIGN PATENT DOCUMENTS

| | | | |
|---|---|---|---|
| JP | 58-93128 | A | 6/1983 |
| JP | 58-94727 | A | 6/1983 |
| JP | 59-8225 | A | 1/1984 |
| JP | 63-49845 | B2 | 10/1988 |
| JP | 63-264833 | A | 11/1988 |
| JP | 64-76630 | A | 3/1989 |
| JP | 2-44624 | A | 2/1990 |
| JP | 3-3327 | B2 | 1/1991 |
| JP | 3-3328 | B2 | 1/1991 |

* cited by examiner

*Primary Examiner*—N. Le
*Assistant Examiner*—John Teresinski
(74) *Attorney, Agent, or Firm*—Foley & Lardner LLP

(57) ABSTRACT

Detection of degradation of the degree of vacuum in a vacuum interrupter suffers from poor sensibility because of mixed presence of various noises other than that due to discharge resulting from degradation The present invention allows accurate detection of degradation of the degree of vacuum by detecting the continuity of discharge produced between an electrode and a shield due to degradation of the degree of vacuum and the duration of discharge. The continuity of discharge is detected in accordance with a time slightly longer than 1 cycle time of a power-source voltage, and the duration of discharge is detected in accordance with a time sufficiently longer than 1 cycle time.

7 Claims, 5 Drawing Sheets

METHOD AND APPARATUS FOR MONITORING VACUUM DEGREE OF VACUUM IN VACUUM INTERRUPTER

TECHNICAL FIELD

The present invention relates a method of monitoring the degree of vacuum in a vacuum interrupter and a vacuum monitoring apparatus used in monitoring of the degree of vacuum.

BACKGROUND ART

FIG. 5 shows an example of a vacuum interrupter, wherein 1 is a vacuum interrupter, and 2 is an insulating tube having both ends to which end plats 3, 4 are mounted to form a vacuum container. A stationary lead 5 having a stationary electrode is arranged through the end plate 3, and a movable lead 7 having a movable electrode is movably arranged through the end plate 4 through a bellows 6. 8 is a shield which is mounted to a middle of the insulating tube to prevent metallic vapor produced between the stationary electrode and the movable electrode from adhering on the inner surface of the insulating tube 2.

Typically, the vacuum interrupter has a normal interrupting capability at the pressure with the degree of vacuum being $5\times10^{-4}$ Torr or less. However, with a long period of use, the degree of vacuum can be degraded due to gas discharged from the inside of the interrupter, slow leakage from a junction by welding, soldering or the like at the time of manufacturing, etc., causing gradual lowering of the interrupting capability.

Since occurrence of poor interruption has a considerably detrimental effect on a power system having the interrupter arranged therein, monitoring of the degree of vacuum when using the vacuum interrupter forms a significant challenge.

FIG. 6 shows the relationship between the degree of vacuum called Paschen curve and the internal discharge of the vacuum interrupter. If occurrence of poor degree of vacuum leads to more than $5\times10^{-4}$ Torr, the discharge is produced between the electrode and the shield in the closed-circuit state of the interrupter. Monitoring of the degree of vacuum is based on detection of this discharge which forms a detection principle for degradation of the degree of vacuum.

Various apparatus for monitoring the degree of vacuum based on the above monitoring principle have been proposed, any of which is constructed to detect a frequency of about 2–20 KHz, presenting insufficiency in terms of the detection sensibility.

Specifically, in the neighborhood of the monitoring apparatus for detecting discharge due to degradation of the degree of vacuum, various noises always occur mixedly in addition to the vacuum interrupter, such as noise produced by a pantograph of a train during passage thereof, noise due to lightening surge and switching surge produced at switching of the interrupter, noise due to excitation rush current of a substation transformer and corona discharge from an insulator during raining, etc. These noises occurs discontinuously, which cannot be distinguished from noise due to degradation of the degree of vacuum, resulting in insufficient detection sensibility of the degree of vacuum.

DISCLOSURE OF THE INVENTION

An object of the present invention is to provide a method and apparatus for monitoring the degree of vacuum, which allows sure distinction of degradation of the vacuum interrupter.

According to the present invention, in an apparatus for monitoring a degree of vacuum in a vacuum interrupter which includes a stationary electrode and a movable electrode arranged in a vacuum container insulated by an insulating tube, and a shield arranged opposite to the stationary electrode and the movable electrode for detecting a degradation of the degree of vacuum in the vacuum interrupter, said degradation of the degree of vacuum is detected by a continuity of a discharge between the electrode and the shield and a duration of the discharge. With this, when degradation of the degree of vacuum occurs, determination is possible between pulses due to discharge resulting from degradation and having continuous duration and noises generated discontinuously, resulting in detection of degradation with excellent sensitivity.

With detection of the continuity of discharge between the electrode and the shield of the vacuum interrupter, said continuity of discharge is detected by a first timer set at a time slightly longer than 1 cycle time of a power-source voltage, and said duration of discharge is detected by a second timer set at a time sufficiently longer than the set time of the first timer.

By such detection, when the degree of vacuum is degraded, the discharge state occurring without exception at each cycle of the frequency of the power-source voltage is detected first by the first timer. Whether or not the discharge state continues during a time longer than a time interval set by the first timer is determined by the second timer. When detected pulses continue over the set time of the second timer, it is determined that degradation occurs to generate an output signal, whereas when they do not continue, the second timer is reset to determine the presence of degradation of degree of vacuum.

Moreover, in an apparatus for monitoring a degree of vacuum in a vacuum interrupter which includes a stationary electrode and a movable electrode arranged in a vacuum container insulated by an insulating tube, and a shield arranged opposite to the stationary electrode and the movable electrode for detecting a degradation of the degree of vacuum in the vacuum interrupter, it comprises an antenna for capturing a discharge phenomenon produced between the electrode and the shield by said degradation of the degree of vacuum, a detection part for introducing and amplifying a signal out of the antenna to detect a signal having a given value level or more, a determination part for inputting the detected signal to determine whether or not the discharge phenomenon is due to the degradation of the degree of vacuum, and an output part for introducing the output signal of the determination part to output a signal indicative of occurrence of an abnormality.

The determination part comprises a first timer set at a time slightly longer than 1 cycle time of a power-source voltage, and a second timer set at a time sufficiently longer than the set time of the first timer.

Moreover, the first timer for carrying out determination has a set time of 30 ms, and the second timer has a set time of 30 sec.

The vacuum monitoring apparatus constructed as described above is arranged in the neighborhood of a pedestal on which the vacuum interrupter is mounted.

BRIEF DESCRIPTION OF THE DRAWINGS

FIGS. 3A–3B show an outside appearance of the vacuum monitoring apparatus, wherein FIG. 3A is a perspective view, and FIG. 3B is a front view;

FIGS. 4A–4C show a mounted state of the vacuum monitoring apparatus, wherein FIG. 4A is a view of direct mounting to a base, FIG. 4B is a view of mounting to a pedestal, and FIG. 4C is a view of mounting to an operation box.

BEST MODE FOR CARRYING OUT THE INVENTION

Figure 1:
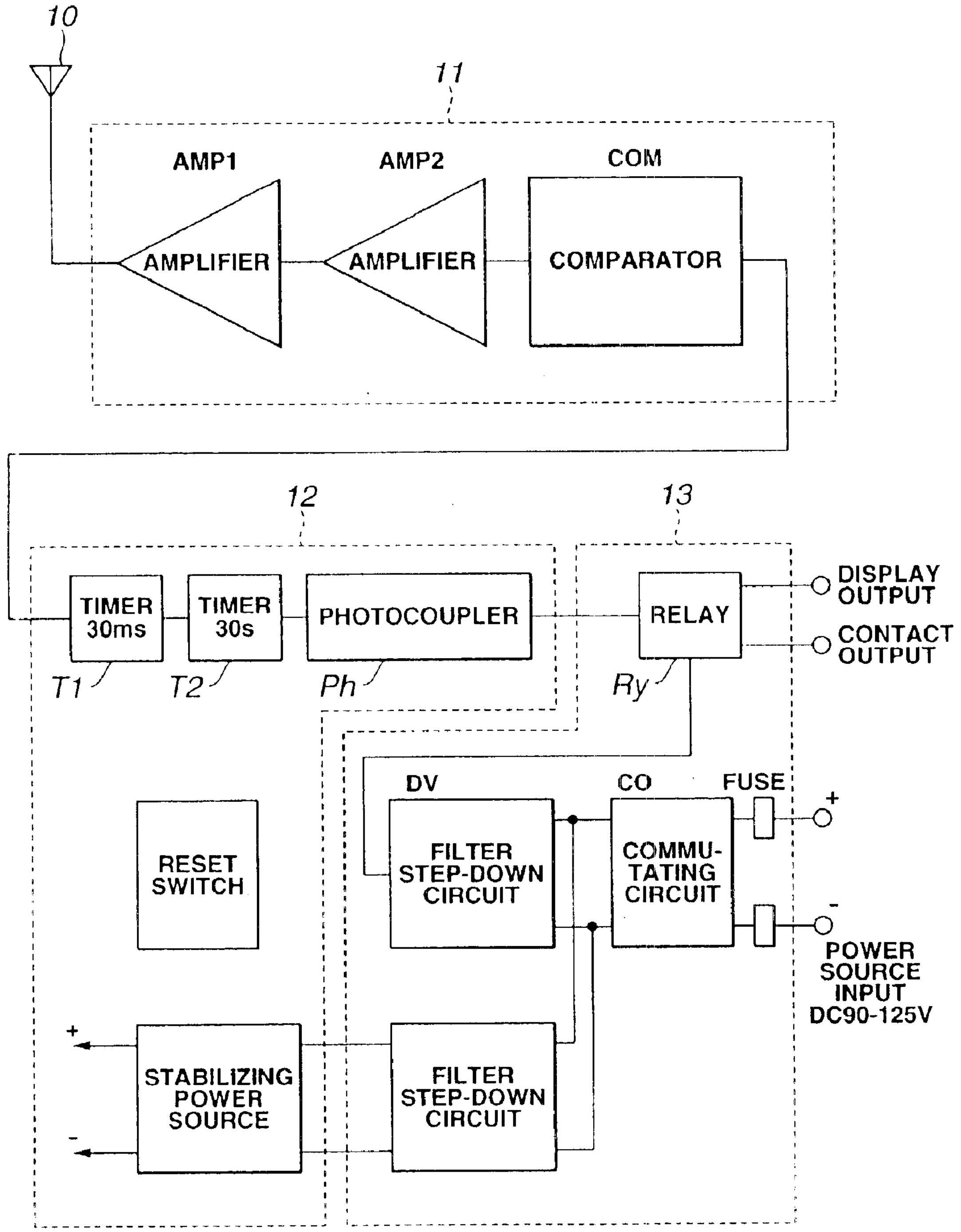
FIG. 1 is a block diagram of a vacuum monitoring apparatus according to the present invention.

FIG. 1 is a block diagram showing an embodiment of a vacuum monitoring apparatus of the present invention, wherein 10 is an antenna for receiving electromagnetic wave generated due to degradation of the degree of vacuum in a vacuum interrupter, and 11 is a detection part which includes amplifiers AMP1, AMP2 and a comparator COM. Electromagnetic pulses introduced through the antenna 10 are amplified by the amplifiers AMP1, AMP2, then compared in terms of level by the comparator COM. A result of comparison or pulses of a given value level or more is detected and delivered to a determination part 12. The determination part 12 comprises a first timer T1, a second timer T2, and an insulating photocoupler Ph. The first timer T1 serves to detect a continuity of discharge, and determines whether or not pulses due to occurrence of degradation of the degree of vacuum are continuously generated every cycle, i.e. 20 ms when the power-source frequency is 50 Hz. Therefore, the timer T1 is set at a time interval with slight allowance with respect to 20 ms, e.g. 30 ms.

The second timer T2 serves to detect a duration of discharge, and has a time interval set at any given time longer than the set time of the first timer, e.g. 30 sec. When discharge continues during a given time or more, a signal is output to an output part 13 through the photocoupler Ph. The output part 13 includes a relay Ry which is actuated when a signal is input to output a display signal such as LED or a contact signal. Moreover, the output part 13 comprises a commutating circuit CO and a step-down circuit DV. Power introduced from a substation or the like is commutated by the commutating circuit CO, which is reduced to a predetermined voltage by the step-down circuit to serve as power for various parts.

Figure 2:
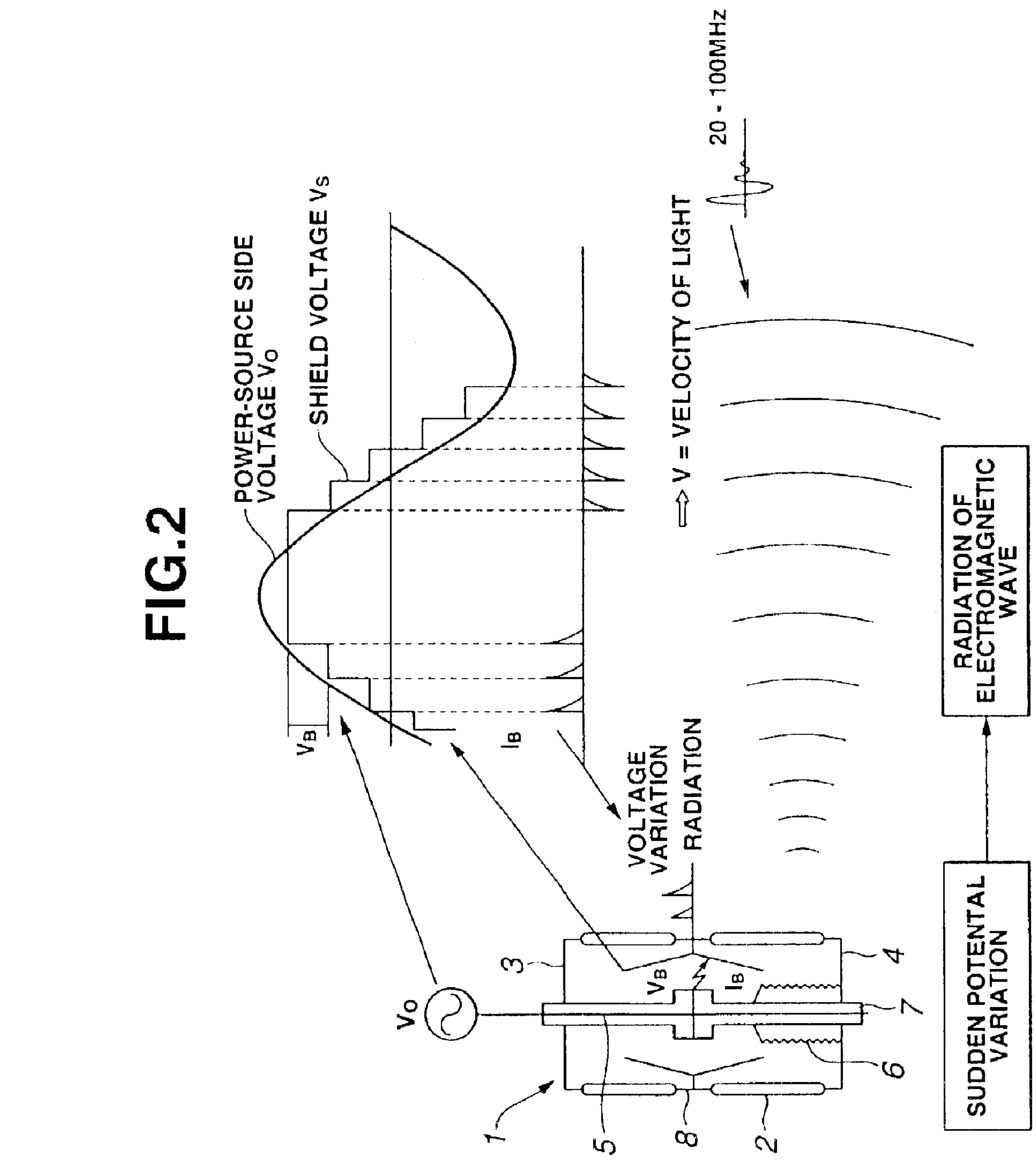
FIG. 2 is a waveform chart for explaining radiation of electromagnetic wave out of a vacuum interrupter.

FIG. 2 is an explanatory view from radiation of electromagnetic wave out of the vacuum interrupter 1 to detection of the electromagnetic wave by the vacuum monitoring apparatus constructed as shown in FIG. 1. When the internal pressure rises due to occurrence of degradation of the degree of vacuum in the vacuum interrupter 1, the resistance in the interrupter lowers by the Paschen's law. As a result, even though the electrodes are in the closed-circuit state, a potential is produced between the shield 8 having a floating potential due to the stationary and movable sides both insulated by the insulating tube 2 and the electrode. When a shield voltage $V_S$ arrives at a breakdown voltage $V_B$, discharge occurs between the electrode and the shield to have passage of a current $I_B$, causing an abrupt potential variation, leading to radiation of electromagnetic wave.

According to experiments, it was revealed that this voltage variation varies stepwise in the following of a variation in a power-source voltage $V_O$ for radiation, and that the frequency of the electromagnetic wave is 20–100 MHz though it varies by capacity of the vacuum interrupter, etc.

The vacuum monitoring apparatus of the present invention is constructed to detect the above RF electromagnetic wave of 20–100 MHz generated by the vacuum interrupter, wherein the electromagnetic wave captured by the antenna 10 is amplified by the amplifiers AM1, AM2, then amplified electromagnetic wave having a voltage value greater than a given value is detected by the comparator COM for output.

As described above, if degradation of the degree of vacuum occurs in the vacuum interrupter, discharge is produced without exception at each cycle of the power-source voltage $V_O$ to generate pulses. The timer T1 having a signal introduced from the comparator is at a time interval with allowance with respect to 1 cycle time of the power-source voltage, e.g. 30 ms, and it starts operation by an input signal. When an interval of pulse input exceeds 30 ms, i.e. an input signal is absent over 1 cycle, the timer T1 is reset.

The timer T2 is set at a time interval sufficiently longer than that of the timer T2, e.g. 30 sec, and it starts operation by an input signal out of the timer T1. When an input signal is absent over a interval of 30 ms or more, the timer is reset.

Specifically, it is determined whether or not it is due to degradation of the degree of vacuum in the vacuum interrupter by the timers T1, T2, and the relay Ry is actuated by the continuity of discharge for 30 sec to output a signal indicative of occurrence of an abnormality.

Figure 3A:
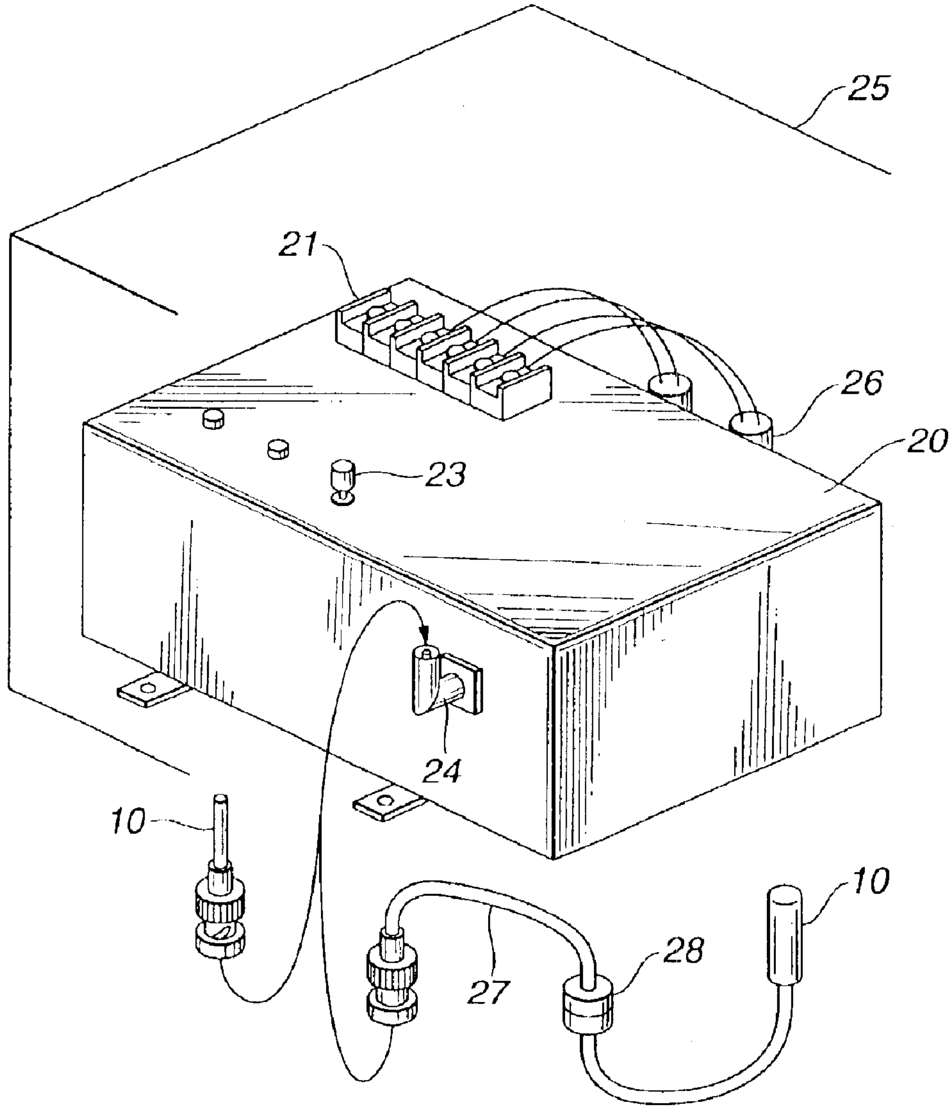
Figure 3B:
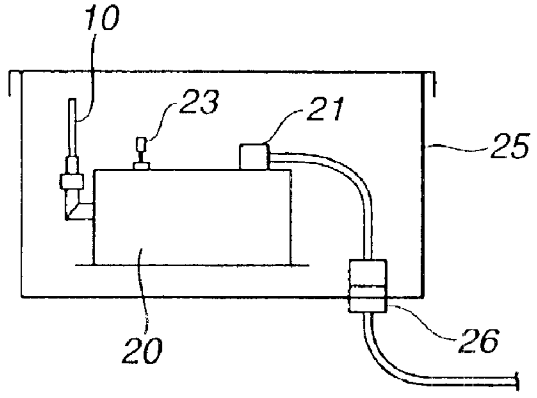

FIGS. 3A–3B show a concept of an outside drawing of the vacuum monitoring apparatus, wherein 20 is a shield casing made of stainless steel in which the apparatus having a circuit structure as shown in FIG. 1 is accommodated. 21 is a terminal block to which connected are a power-source cable drawn from the outside of the vacuum monitoring apparatus and a cable for leading a contact signal or output signal of the relay to the outside of the apparatus. 22 is an LED for indicating the normality or the abnormality, 23 is a reset switch, and 24 is an antenna support to which the antenna 10 is mounted by screwing or the like. By mounting of the antenna 10, it is electrically insulated from the detection part 11. 25 is a waterproof casing made of resin or the like, which serves to cover a shield casing 20 during outdoor application while it is unnecessary during indoor application. 26 is a waterproof connection or connector, and 27 is an extension antenna line used during outdoor application, which includes a coaxial cable and has an external antenna 10*a* mounted at a front end. The extension antenna line 27 has an outside leading part to which a waterproof connection or connector 28 is provided as necessary.

Figure 4A:
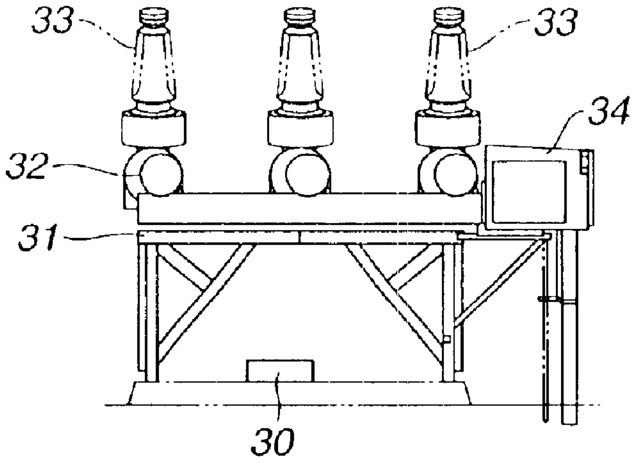
Figure 4B:
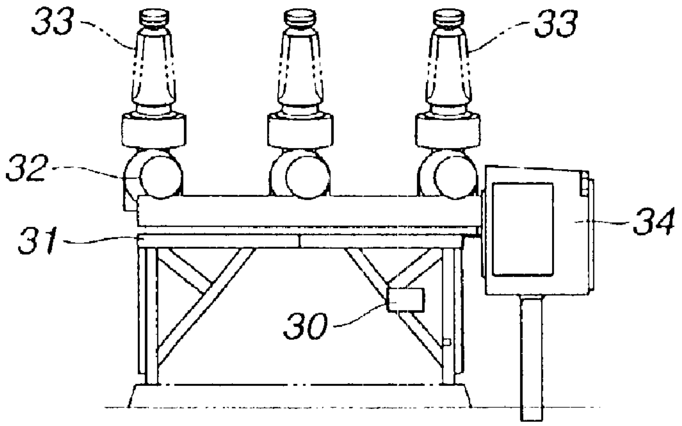
Figure 4C:
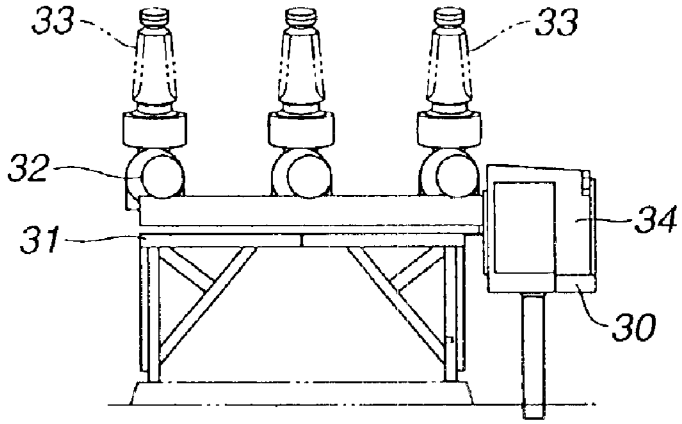
Figure 5:
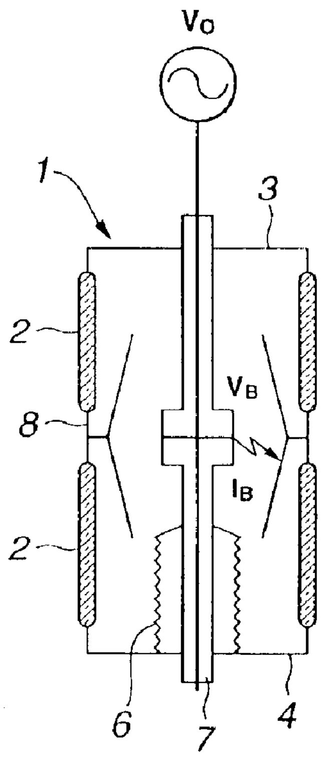
FIG. 5 is a construction diagram of the vacuum interrupter.
Figure 6:
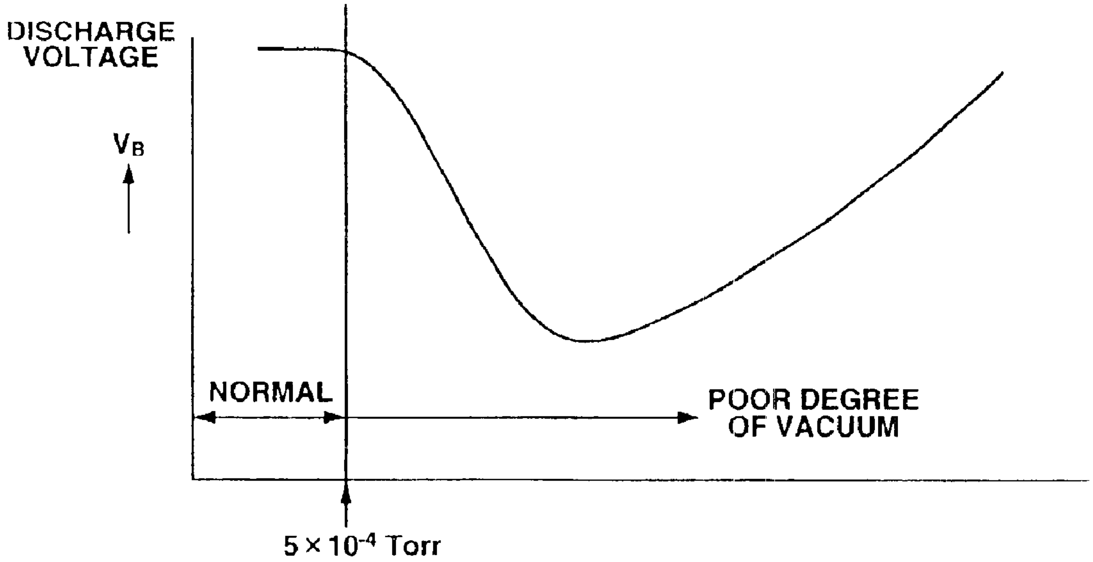
FIG. 6 is a Paschen curve showing the relationship between the degree of vacuum and the discharge.

FIGS. 4A–4C show a case that the vacuum monitoring apparatus of the present invention is provided to a tank-type vacuum interrupter which is used when the vacuum interrupter is installed outdoors.

In the drawings, 31 is a pedestal arranged on a base of concrete or the like, and 32 is a tank for accommodating the vacuum interrupter, the tanks 32 for three phases being arranged parallel on the pedestal 31. 33 is a bushing, 34 is an operation box for accommodating parts for operating the vacuum interrupter, and 30 is the vacuum monitoring apparatus constructed as shown in FIGS. 3A–3B.

FIG. 4A shows a case that the vacuum monitoring apparatus is mounted directly on the base, FIG. 4B shows a case that it is mounted on the pedestal 31, and FIG. 4C shows a case that it is mounted in the operation box.

In all cases, when the vacuum monitoring apparatus detects degradation of the degree of vacuum, a detection signal is delivered to a monitoring station such as a substation through a transmission line.

As described above, according to the present invention, detection of discharge due to degradation of the degree of vacuum in the vacuum interrupter is carried out in accordance with the continuity and duration of electromagnetic wave. With this, no reaction is carried out to discontinuous noise resulting from discharge other than that due to degradation of the degree of vacuum, allowing achievement of the vacuum monitoring apparatus with high detection accuracy.

What is claimed is:

1. A method of monitoring a degree of vacuum in a vacuum interrupter which includes a stationary electrode and a movable electrode arranged in a vacuum container insulated by an insulating tube, and a shield arranged opposite to the stationary electrode and a movable electrode for detecting a degradation of the degree of vacuum in the vacuum interrupter, comprising:

detecting said degradation of the degree of vacuum by a continuity of a discharge between the electrode and the shield and a duration of the discharge;

detecting said continuity of the discharge by a first timer set at a time longer than 1 cycle time of a power-source voltage; and detecting said duration of the discharge by a second timer set at a time longer than the set time of the first timer.

2. An apparatus for monitoring a degree of vacuum in a vacuum interrupter, comprising:

a vacuum container;

an insulating tube insulating the vacuum container;

a stationary electrode and a movable electrode arranged in the vacuum container;

a shield arranged opposite to the stationary electrode and the movable electrodes, the shield detecting a degradation of the degree of vacuum in the vacuum interrupter;

an antenna capturing a discharge phenomenon produced between the electrodes and the shield by said degradation of the degree of vacuum;

a detection part introducing and amplifying a signal out of the antenna to detect a signal having a given value level or more;

a determination part comprising a first timer set at a time longer than a 1 cycle time of a power-source voltage, and a second timer set at a time longer than the set time of the first timer, the determination part detecting a continuity of a discharge between the electrode and the shield and a duration of the discharge to determine whether or not the discharge phenomenon is due to the degradation of the degree of vacuum; and an output part introducing an output signal of the determination part to output a signal indicative of occurrence of an abnormality.

3. The apparatus of claim 2, wherein said set time of the first timer is 30 ms, and said set time of the second timer is 30 s.

4. The apparatus of claim 3, further comprising a pedestal on which said vacuum interrupter is mounted, wherein the apparatus for detecting the degradation of the degree of vacuum in the vacuum interrupter is arranged in the neighborhood of the pedestal.

5. The apparatus of claim 2, further comprising a pedestal on which said vacuum interrupter is mounted, wherein the apparatus for detecting the degradation of the degree of vacuum in the vacuum interrupter is arranged in the neighborhood of the pedestal.

6. A method of monitoring a degree of vacuum in a vacuum interrupter which includes a stationary electrode and a movable electrode arranged in a vacuum container insulated by an insulating tube, and a shield arranged opposite to the stationary electrode and a movable electrode for detecting a degradation of the degree of vacuum in the vacuum interrupter, the method comprising:

detecting said degradation of the degree of vacuum by a continuity of a discharge between the electrode and the shield and a duration of the discharge;

detecting said continuity of the discharge by a first timer set at a time longer than 1 cycle time of a power-source voltage; and detecting said duration of the discharge by a second timer set at a time longer than the set time of the first timer, wherein said set time of the first timer is 30 ms, and said set time of the second timer is 30 s.

7. An apparatus for monitoring a degree of vacuum in a vacuum interrupter, comprising:

a vacuum container;

an insulating tube insulating the vacuum container;

a stationary electrode and a movable electrode arranged in the vacuum container;

a shield arranged opposite to the stationary electrode and the movable electrode, the shield detecting a degradation of the degree of vacuum in the vacuum interrupter;

an antenna capturing a discharge phenomenon produced between the electrodes and the shield by said degradation of the degree of vacuum;

a detection part introducing and amplifying a signal out of the antenna to detect a signal having a given value level or more;

a determination part comprising a first timer set at a time longer than 1 cycle time of a power-source voltage, and a second timer set at a time longer than the set time of the first timer, the determination part detecting a continuity of a discharge between the electrode and the shield and a duration of the discharge to determine whether or not the discharge phenomenon is due to the degradation of the degree of vacuum; and an output part introducing an output signal of the determination part to output a signal indicative of occurrence of an abnormality, wherein said set time of the first timer is 30 ms, and said set time of the second timer is 30 s.

* * * * *